US008212205B2

(12) United States Patent
Giering et al.

(10) Patent No.: US 8,212,205 B2
(45) Date of Patent: Jul. 3, 2012

(54) DEVICE AND METHOD FOR VERIFYING VALUABLE DOCUMENTS

(75) Inventors: Thomas Giering, Kirchseeon (DE); Helmut Steidl, München (DE); Dieter Stein, Holzkirchen (DE); Klaus Thierauf, München (DE)

(73) Assignee: Giesecke & Devrient GmbH, Munich (DE)

( * ) Notice: Subject to any disclaimer, the term of this patent is extended or adjusted under 35 U.S.C. 154(b) by 1022 days.

(21) Appl. No.: 11/918,343

(22) PCT Filed: Apr. 11, 2006

(86) PCT No.: PCT/EP2006/003332
§ 371 (c)(1),
(2), (4) Date: Apr. 30, 2008

(87) PCT Pub. No.: WO2006/108616
PCT Pub. Date: Oct. 19, 2006

(65) Prior Publication Data

US 2009/0225303 A1 Sep. 10, 2009

(30) Foreign Application Priority Data

Apr. 12, 2005 (DE) ......................... 10 2005 016 824

(51) Int. Cl.
*G06K 11/00* (2006.01)
*G06K 7/10* (2006.01)

(52) U.S. Cl. ..................... 250/271; 250/556; 250/338.1; 250/559.01; 283/91; 283/72; 283/85

(58) Field of Classification Search .................. 250/556, 250/271, 548, 559, 316.1, 338.1; 283/91, 283/72, 85, 13
See application file for complete search history.

(56) References Cited

U.S. PATENT DOCUMENTS

| | | | |
|---|---|---|---|
| 4,756,557 | A | 7/1988 | Kaule et al. |
| 5,367,577 | A | 11/1994 | Gotaas |
| 5,757,001 | A | 5/1998 | Burns |
| 6,061,121 | A | 5/2000 | Holl et al. |
| 2002/0185609 | A1 | 12/2002 | Giering |
| 2003/1023049 | | 7/2003 | Gerz et al. |
| 2005/0069190 | A1 | 3/2005 | Yoshioka et al. |
| 2007/0189595 | A1 | 8/2007 | Giering |

FOREIGN PATENT DOCUMENTS

| | | |
|---|---|---|
| DE | 2 021 093 | 11/1971 |
| DE | 34 46 861 A1 | 7/1986 |
| DE | 195 17 194 A1 | 11/1996 |

(Continued)

OTHER PUBLICATIONS

Search Report of German Patent Office regarding German Patent Application No. 10 2005 016 824.8, Feb. 6, 2006.

*Primary Examiner* — David Porta
*Assistant Examiner* — Yara Green
(74) *Attorney, Agent, or Firm* — Bacon & Thomas, PLLC

(57) ABSTRACT

The invention relates to an apparatus and a method for automatically checking sheet-shaped documents of value.

According to the present invention a simply constructed measuring apparatus can be obtained, by the measuring apparatus evaluating measuring values e.g. at least two measuring frequencies and the position of one or a plurality of discrete measuring tracks being determined in such a way that at least the presence of two different not visible spectral properties of a predetermined type of authentic documents of value can be checked.

14 Claims, 2 Drawing Sheets

FOREIGN PATENT DOCUMENTS

| | | | |
|---|---|---|---|
| DE | 197 01 513 | C2 | 7/1998 |
| DE | 198 08 652 | A1 | 9/1999 |
| DE | 100 07 887 | A1 | 8/2001 |
| DE | 20 2004 019 706 | U1 | 3/2005 |
| EP | 1 233 261 | A1 | 8/2002 |
| EP | 1 265 199 | A2 | 12/2002 |
| EP | 1 519 327 | A2 | 3/2005 |
| JP | 2005025624 | A | 1/2005 |
| WO | WO 2004/036508 | A2 | 4/2004 |
| WO | WO 2005/036481 | A1 | 4/2005 |

DEVICE AND METHOD FOR VERIFYING VALUABLE DOCUMENTS

FIELD OF THE INVENTION

The invention relates to an apparatus and a method for automatically checking sheet-shaped documents of value.

BACKGROUND

Although not restricted to it, the invention in particular relates to the check of bank notes, checks or coupons which are provided with machine-readable security features that can be optically checked in the invisible spectral region, in order to e.g. check or determine the authenticity and/or the nominal value of the document of value. Such security features detectable in the invisible spectral region, for example, can be substances emitting or absorbing in the ultraviolet or infrared (for short: IR) which are contained in the printing ink or in the bank note paper.

Systems for optically checking such documents of value are known, for example, from DE 10007887 A1, DE 19701513 C2, WO 2004/036508, U.S. Pat. No. 5,757,001 or EP 1233261 A1.

SUMMARY

Starting out from this prior art it is the problem of the present invention to permit an effective check of such documents of value with a simply and cost-effectively constructed measuring apparatus.

This problem is solved by the independent claims. In the dependent claims and the following description preferred embodiments are explained.

Therefore, according to the present invention, a simply constructed measuring apparatus can be obtained by the measuring apparatus evaluating measuring values e.g. at least two measuring frequencies and the position of one or a plurality of discrete measuring tracks being determined in such a way, that at least the presence of two different not visible spectral properties of a predetermined type of authentic documents of value can be checked. The measuring apparatus preferably is adapted to measure in the infrared spectral region and the different not visible spectral properties are e.g. different spatial and/or spectral courses of measuring values.

In case of documents of value transported in longitudinal transport in relation to the measuring apparatus already one single measuring track and in case of documents of value transported in transverse transport in relation to the measuring apparatus already two measuring tracks can be sufficient in order to be able to check even different not visible spectral properties and thus to permit a secure check with at the same time low costs for the measuring apparatus. The measuring apparatus can be not only permanently integrated in a processing apparatus, but preferably can be a handheld checking device, too, in which the bank notes are automatically or manually transported past the measuring elements of the measuring apparatus in longitudinal or transverse transport.

Further advantages of the present invention can be seen from the dependent claims and the following description of preferred embodiments with the help of the attached Figures.

It shall be especially emphasized that the features of the dependent claims and the embodiments described in the description below can be advantageously used in combination with but also independent of each other and of the subject matter of the main claims.

DETAILED DESCRIPTION OF VARIOUS EMBODIMENTS

Although not restricted to it, in the following first of all the check of bank notes in the infrared spectral region is described. Additionally or alternatively, a measurement can also be effected in different not visible spectral regions.

Figure 1:
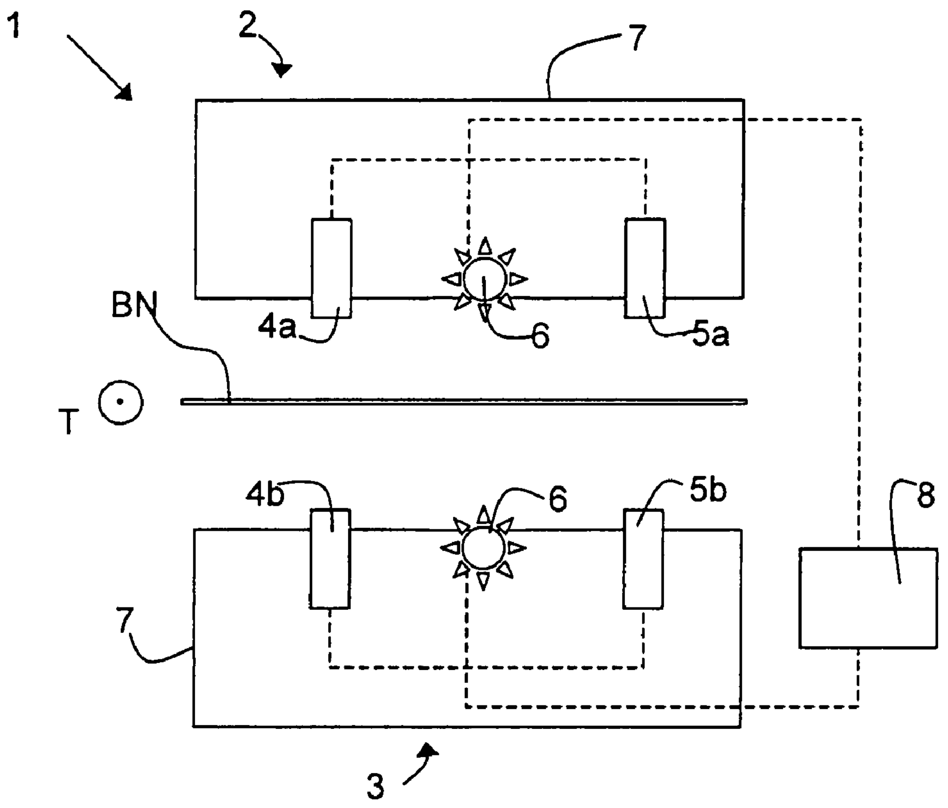
FIG. 1 shows a schematic cross-sectional view onto a measuring apparatus for bank notes according to a first embodiment.

FIG. 1 shows in a merely exemplary fashion a schematic cross-sectional view onto a measuring apparatus 1 for bank notes BN according to a first embodiment. Such measuring apparatuses 1 can be used e.g. in paper production apparatuses, bank-note printing apparatuses, bank-note counting apparatuses or bank-note sorting apparatuses, bank-note depositing apparatuses and/or bank note dispensing apparatuses, vending machines or in other bank note processing apparatuses. In addition, the use as a handheld checking device is possible.

Measuring apparatus 1 has two preferably identically structured sensor modules 2 and 3, between which a bank note BN to be checked is transported past in the direction of T. In this case the transport is a transverse transport. This means, that the bank notes BN are transported in parallel to the shorter bank note edges in the direction of T.

The sensor modules 2, 3 each have a housing 7, in which are contained a light source 6 for a large-surface illumination of the bank note BN at least with infrared light and two separate detectors 4*a*, 5*a* or 4*b*, 5*b*, which capture the light emanating in reflection from different areas of the bank note BN. By the bank note BN being transported past between the sensor modules 2, 3 in the direction of T during the measurement, the detector units 4*a*, 5*a* or 4*b*, 5*b* measure the infrared radiation emanating from the bank note BN in spaced-apart measuring tracks S1 and S2 on the front and S3 and S4 on the back.

Figure 2:
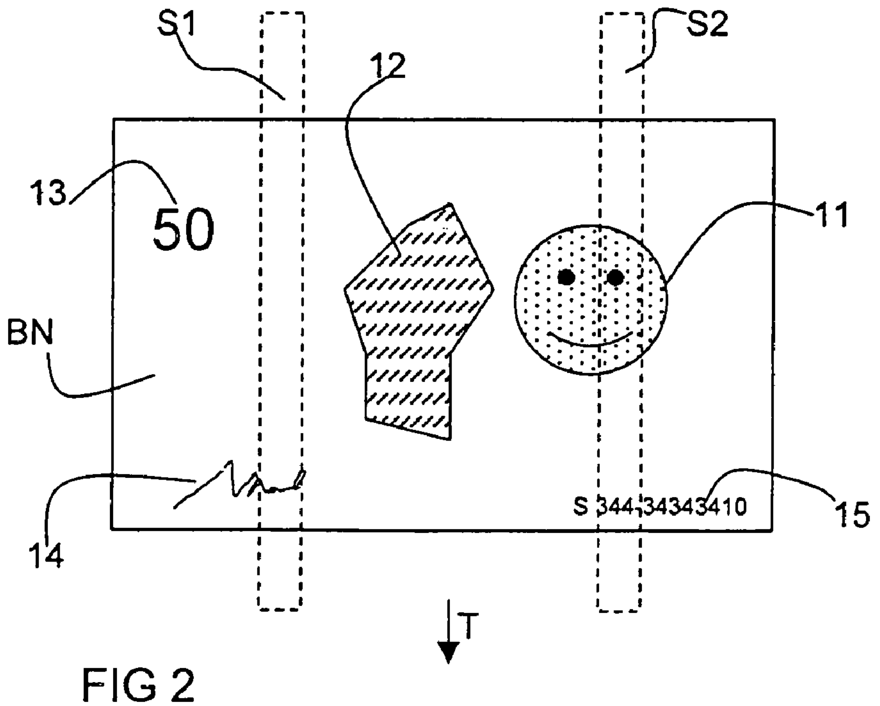
FIG. 2 shows a schematic view in the visible spectral region onto the front of a bank note, which is checked with the measuring apparatus of FIG. 1.
Figure 3:
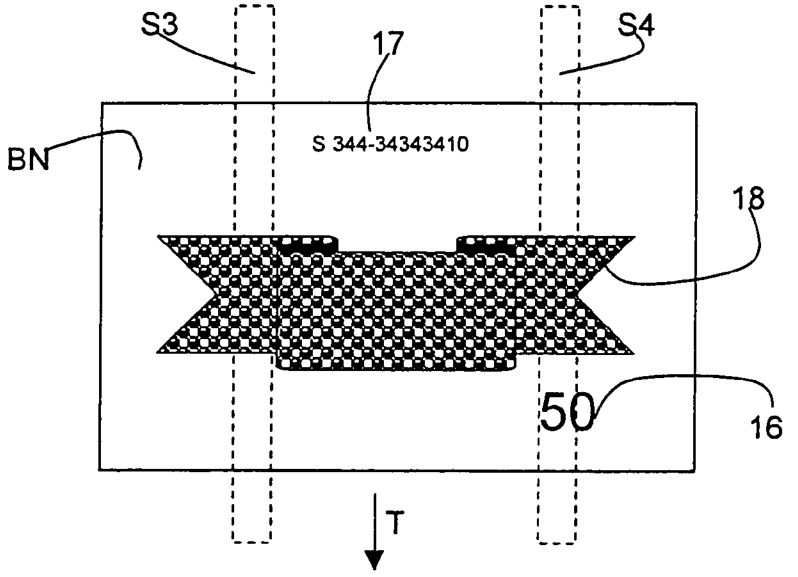
FIG. 3 shows a schematic view in the visible spectral region onto the back of the bank note of FIG. 2, which is checked with the measuring apparatus of FIG. 1
Figure 4:
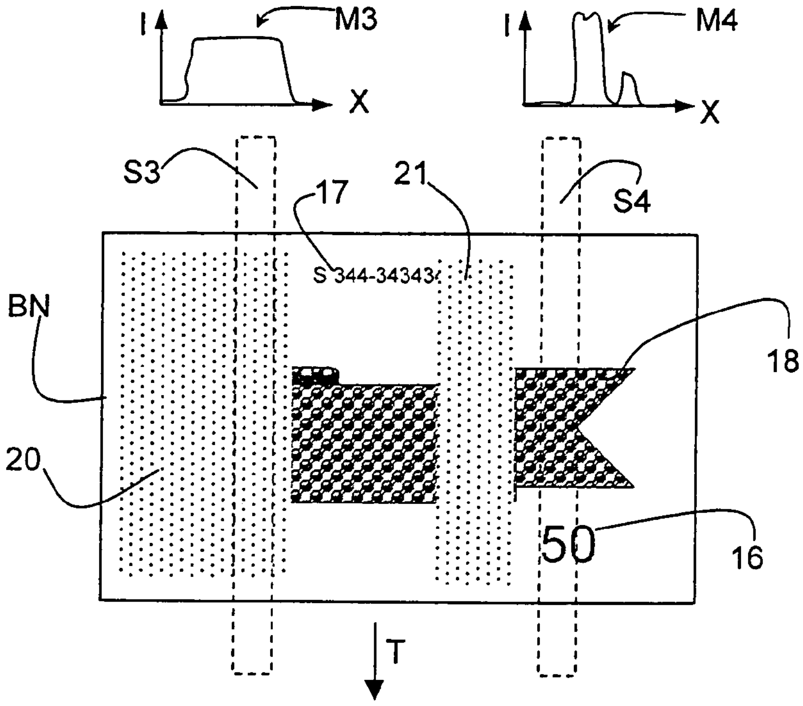
FIG. 4 shows a schematic view in the infrared spectral region onto the back of the bank note of FIG. 2, which is checked with the measuring apparatus of FIG. 1.

FIGS. 2 to 4 illustrate these measuring tracks with dashed contour lines S1 (detector 4*a*) and S2 (detector 5*a*) for the upper sensor module 2. FIG. 3 illustrates the respective measuring tracks with dashed contour lines S3 (detector 4*b*) and S4 (detector 5*b*) for the lower sensor module 3.

Furthermore, the detectors 4*a*, 5*a* or 4*b*, 5*b* each measure at least two different infrared frequencies or frequency ranges. As explained in the following, determining the measuring tracks and measuring frequencies is effected in dependence on the properties of the documents of value to be checked.

The measuring values of the sensor modules 2, 3 are supplied to an EDP-aided evaluation unit 8 via data line. The evaluation unit 8 either is a constituent part of the measuring apparatus 1 or a separate component.

Measuring apparatus 1 is adapted to automatically check one or a plurality of predetermined types of bank notes BN.

Different types of bank notes can mean bank notes of different currencies, but also bank notes BN of different nominal values of one currency.

For explaining the system according to the invention in the following reference is made, in a merely exemplary fashion, to the check of the bank note BN shown in FIGS. 2 to 4 with the aid of the measuring apparatus 1 according to FIG. 1.

Herein the bank note BN is shown together with the pertinent measuring tracks S1-S4 in a view onto the front (FIG. 2) or onto the back (FIGS. 3, 4). FIGS. 2 and 3 show the bank note BN as it is perceived in the visible spectral region and FIG. 4 shows how the bank note BN is perceived in the infrared spectral region.

Checking such bank notes BN with measuring apparatus 1 can be effected as follows:

At first the presence, position and distribution of checkable infrared spectral properties are experimentally ascertained by measuring authentic bank notes BN. Then the distance of the two detectors 4*a*, 5*a* or 4*b*, 5*b* per sensor module 2 or 3 is adjusted or predetermined such that by evaluating the measuring values in the pertinent resulting measuring tracks S1, S2 or S3, S4 there can be checked at least the presence of two different infrared spectral properties of this bank note BN at least two measuring frequencies. The different infrared spectral properties can relate to e.g. a different spatial and/or spectral course of the measured radiation of the bank note BN.

It should be emphasized that these different spectral properties usually are different for different bank note currencies or nominal values. For that reason the determination of the measuring tracks S1, S2 or S3, S4 and measuring frequencies of course will be different, depending on whether e.g. Euros, Swiss francs, pounds sterling, Swedish crowns, United States dollars or Japanese yens are checked according to the invention.

E.g. there can also be checked bank notes BN, in which an infrared absorber is present only in at least a partial surface of the entire bank note surface and the position of the measuring track is determined such that the presence of the infrared absorber in the specific partial surface is checked as a first infrared spectral property. Infrared absorbers are known feature substances in the bank note paper or the printing ink, which absorb in the infrared spectral region, so that on measuring in these absorbing frequency ranges distinctly less infrared radiation is remitted by the bank notes than with bank notes without infrared absorber. Examples of this are described e.g. in WO 03/038001 A1.

In the merely exemplary embodiment of a bank note according to FIGS. 2 to 4 a first infrared absorber is (only) present in the graphic structures 11, 12 of the front and a second infrared absorber having a different absorption spectrum is (only) present in the printing ink of the nominal value 16 printed onto the back of the bank note BN.

Besides these areas 11, 12 or 16 having different infrared spectral properties, the printing inks of the graphic structure 18 of the back, of the signature 14 and of the nominal value printing 13 on the front and the printing inks of the serial numbers 15, 17 on the front or back have substances luminescent in the infrared, which have a spectral behavior different than that of the two infrared absorbers.

In addition, the bank note BN has two so-called infrared sections 20, 21 on the back. These are the areas shown in a dotted fashion in the infrared view of FIG. 4, in which the intensity in the infrared is largely homogeneous. In contrast to this the surrounding areas mostly have no or a spatially substantially more varying distribution of the intensity in the infrared.

E.g. in the graphic structures 11 and 18 the intensity in the infrared varies distinctly more and similar to that in the visible spectral region. This difference is illustrated by way of example by the measuring curves M3, M4 in the FIG. 4, the intensity I being plotted against the place X of the measurement along the tracks S3 or S4. Along the track S3, i.e. especially in the area of the infrared section 20, the IR intensity is largely constant, while along the track 4 it is spatially more modulated.

After the position and the properties of the bank notes BN to be checked were ascertained, subsequently, the position and the distance of the detectors 4*a*, 5*a* or 4*b*, 5*b* and the pertinent measuring tracks S1, S2 or S3, S4 are determined such that at least two of these different IR properties can be checked.

For checking the bank note BN transported past in transverse transport in the FIGS. 2 to 4, already the two detectors 4*a*, 5*a* or 4*b*, 5*b* per side are sufficient in order to check the IR properties of the areas 11, 14, 15, 16, 18, 20. Even when in this case a measurement of the IR properties of the areas 12, 13, 17 and 21 is not possible, since these lie outside the measuring tracks S1, S2 or S3, S4, with this sensor already the most forgeries can be recognized.

It should again be emphasized that depending on the bank note to be checked already the measuring in only one track, in particular in the case of a longitudinal transport in parallel to the longer bank note side, can be sufficient.

A further advantage of the measuring apparatus 1 of FIG. 1 is that the above-mentioned IR properties can also be checked independent of the position of the bank note BN, i.e. not only when front and back are interchanged, but even when left and right are interchanged. Therefore, in the case of the shown position of the bank note BN a check of the presence of the IR section 20 e.g. with the help of track S3 is possible. If instead the bank note BN is in a position rotated by 180° in relation to the paper plane, the IR section 20 can be measured by track S4 and in the case of an interchanged front or back the IR section 20 can be measured by track S1 or S2. From this results that with such a measuring apparatus 1*a* position measurement can be carried out, too, since with authentic bank notes BN the measurements of the four tracks S1-S4 always have to lie in a predetermined relation to each other.

Advantageously, all or a part of the measuring tracks are disposed symmetrical in relation to the bank note BN. The measuring tracks S1 in relation to S2 or S3 in relation to S4 are disposed such that the distance to the left edge (measuring tracks S1, S3) or right edge (measuring tracks S2, S4) extending in parallel to the transport direction T is equal.

As mentioned it is necessary that not only the spatial distribution at one frequency, but at least for a part of the properties to be checked the IR spectrum is measured at least two spectrally different, preferably at least two spectrally spaced-apart frequencies. The measuring frequencies will be chosen depending on the actual material properties of the bank note paper or on its printing ink. In a merely exemplary fashion reference is made to U.S. Pat. No. 5,757,001, in which e.g. with respect to its FIG. 4 is described in detail, that already a measurement at two different infrared wavelengths of about 870 and 930 nanometers in certain areas of a bank note BN can be sufficient in order to be able to distinguish between authentic and forged bank notes on the basis of the different ratios of the measured intensities at these two wavelengths.

Therefore, there can also be checked e.g. the presence of an infrared absorber in the partial areas 11 and/or 16, in such a way that at least a part or all detectors 4*a*, 5*a* or 4*b*, 5*b* measure measuring values at least two different IR frequencies, and the evaluation unit 8 compares them with a spectral course at the at least two different IR frequencies to be expected for authentic documents of value, while the spectral courses e.g. for the different infrared absorbers can also differ from each other.

In addition, there can be checked a further IR spectral property in a different infrared absorber-free partial surface by comparing measuring values measured at least one frequency with a different spectral property to be expected for authentic bank notes BN. This can be e.g. the measurement of the IR section 20 at merely one IR measuring frequency. The combination of measuring IR absorbers and IR sections is an example for the fact that a different number of measuring frequencies is necessary in order to check the presence of the different spectral properties. It should be emphasized that an especially distinct advantage of the present invention results from a combination of a plurality of such different evaluations, such as e.g. not only the check of IR absorbers, but also e.g. of an IR section. With that the probability of a faulty evaluation is considerably reduced.

Besides the described examples still further variations are conceivable.

In the above there was described by way of example that the IR absorbers are only contained in the printing ink of the graphic front-side structures 11, 12 and the back-side nominal value detail 16. Of course this is merely an example, and with authentic bank notes BN the infrared absorbers or the other feature substances to be checked in the infrared can also be present and checked in other partial areas of the bank note substrate and/or of the printed image, the partial areas having been produced e.g. with the help of steel gravure printing, letterpress printing, indirect relief printing and/or by offset printing and/or being part of another graphic structure, such as a serial number 15, 17, a signature 14, a bank seal, a date of issue, a watermark or the like.

It should be further noted that the infrared radiation not necessarily has to be measured in reflection, in other variants, additionally or alternatively, infrared radiation can also be measured in transmitted light, i.e. through the bank note BN.

In conclusion it should be emphasized that, basically, even further measurements can be carried out in the same measuring apparatus 1 or another measuring apparatus in order to check the authenticity and/or the nominal value of the bank note BN. E.g. UV measurements in transmitted light and/or reflection can also be carried out in order to be able to detect e.g. UV brighteners. Since mostly these are distributed largely over the whole area in the bank note paper, a pertinent UV measuring track, basically, can be positioned everywhere over the bank note surface. In the described example it can be positioned e.g. between or beside the measuring tracks S1, S2 or S3, S4. In addition, other than optical measurements, such as measurements of the electrical conductivity or magnetism can be carried out for checking the bank notes.

The invention claimed is:

1. A method for automatically checking sheet-shaped documents of value, comprising the following steps:

defining the position of two measuring tracks of a measuring apparatus in such a way that at least the presence of two different not visible spectral properties of a predetermined type of authentic documents of value can be checked, wherein the two different not visible spectral properties are provided in certain areas of the documents of value, and said checking of at least the presence of the two different not visible spectral properties can be conducted independently of whether the document of value is in a first position or in a second position rotated by 180° in relation to the document plane, irradiating the document of value along the measuring tracks, capturing measuring values of the irradiated document of value along the measuring tracks, wherein at least in a part of the measuring tracks the measuring is carried out at least two spectrally spaced-apart measuring frequencies, and ascertaining, whether the at least two different spectral properties of the predetermined type of authentic documents of value were captured.

2. The method according to claim 1, wherein the presence of documents of value is checked, in which an infrared absorber is present only in at least a partial surface of the entire surface of the document of value and the position of the measuring track is determined in such a way that the presence of the infrared absorber in the specific partial surface can be checked.

3. The method according to claim 1, wherein at least one of the measuring frequencies and the position of the measuring track are determined in such a way that the presence of an infrared absorber in a specific partial surface is checked by comparing measuring values of a measuring track at least two different frequencies with a spectral course to be expected for authentic documents of value.

4. The method according to claim 1, wherein a second spectral property in another infrared-absorber-free partial surface is checked by comparing measuring values at least one frequency with another spectral property to be expected for authentic documents of value.

5. The method according to claim 1, wherein a varying number of measuring frequencies is necessary in order to check the presence of the different spectral properties, and/or at least a part of the measuring tracks is disposed symmetrical in relation to the position of the document of value to be checked.

6. The method according to claim 1, wherein with authentic documents of value the infrared absorber is only present and checked in a partial surface of at least one of the substrate of the document of value and the printed image of the document of value, the partial surface having been produced with the help of a process selected from the group consisting of steel gravure printing, letterpress printing, indirect relief printing and offset printing, said partial surface being part of at least one of a graphic structure, a currency detail, a signature, a portrait image, a bank seal, a date of issue, and a watermark.

7. The method according to claim 1, wherein a first of the spectral properties to be checked is a check regarding the presence of an infrared absorber and a second spectral property to be checked is a check regarding the presence of an infrared section in the surface of the document of value.

8. A method for automatically checking sheet-shaped documents of value, comprising the following steps:

defining the position of two measuring tracks of a measuring apparatus in such a way that at least the presence of two different not visible spectral properties of a predetermined type of authentic documents of value can be checked, and said checking conducted independently of whether the document of value is in a first position or in a second position rotated by 180° in relation to the document plane, wherein the position of the two measuring tracks is defined using data of not visible spectral properties of the predetermined type of authentic documents of value, irradiating the document of value along the measuring tracks, capturing measuring values of the irradiated document of value along the measuring tracks, wherein at least in a part of the measuring tracks the measuring is carried out at least two spectrally spaced-apart measuring frequencies, and ascertaining, whether the at least two different spectral properties of the predetermined type of authentic documents of value were captured.

9. The method according to claim 8, wherein the presence of documents of value is checked, in which an infrared absorber is present only in at least a partial surface of the entire surface of the document of value and the position of the measuring track is determined in such a way that the presence of the infrared absorber in the specific partial surface can be checked.

10. The method according to claim 8, wherein at least one of the measuring frequencies and the position of the measuring track are determined in such a way that the presence of an infrared absorber in a specific partial surface is checked by comparing measuring values of a measuring track at least two different frequencies with a spectral course to be expected for authentic documents of value.

11. The method according to claim 8, wherein a second spectral property in another infrared-absorber-free partial surface is checked by comparing measuring values at least one frequency with another spectral property to be expected for authentic documents of value.

12. The method according to claim 8, wherein a varying number of measuring frequencies is necessary in order to check the presence of the different spectral properties, and/or at least a part of the measuring tracks is disposed symmetrical in relation to the position of the document of value to be checked.

13. The method according to claim 8, wherein with authentic documents of value the infrared absorber is only present and checked in a partial surface of at least one of the substrate of the document of value and the printed image of the document of value, the partial surface having been produced with the help of a process selected from the group consisting of steel gravure printing, letterpress printing, indirect relief printing and offset printing, said partial surface being part of at least one of a graphic structure, a currency detail, a signature, a portrait image, a bank seal, a date of issue, and a watermark.

14. The method according to claim 8, wherein a first of the spectral properties to be checked is a check regarding the presence of an infrared absorber and a second spectral property to be checked is a check regarding the presence of an infrared section in the surface of the document of value.

* * * * *